Feb. 14, 1967    R. FISHER    3,303,735

HOOK BOLT AND NUT ASSEMBLY

Filed Feb. 1, 1965

INVENTOR.
Roy Fisher

United States Patent Office 3,303,735
Patented Feb. 14, 1967

3,303,735
HOOK BOLT AND NUT ASSEMBLY
Roy Fisher, Winnipeg, Manitoba, Canada, assignor to Christopher L. Fisher, St. Boniface, Manitoba, Canada
Filed Feb. 1, 1965, Ser. No. 429,506
5 Claims. (Cl. 85—1)

This invention relates to new and useful improvements in hook bolt and nut assemblies, adapted to be insertable through an aperture in a member from one side thereof and engageable therewith, without the necessity of access from the other side.

The assembly is specifically designed for use with tunnel liner sections which normally consist of relatively heavy gauge corrugated steel sections which are assembled and bolted together within a tunnel.

Due to the relatively small clearance between the tunnel liner sections and tunnel wall, it is often difficult to utilize normal nut and bolt assemblies as one portion of these assemblies has to be inserted from one side and the other portion engaged from the other side.

The principal object and essence of this invention is therefore to provide a device of the character herewithin described which provides a clamping assembly insertable and capable of being tightened from one side of a member.

Another object of the invention is to provide a device of the character herewithin described which, due to the construction thereof, gives a relatively large bearing surface between the bolt assembly and the walls of the aperture within the member.

A yet further object of the invention is to provide a device of the character herewithin described which facilitates the bolting together of tunnel sections and eliminates the necessity of access to the bolting assemblies from the outer surface of said tunnel sections.

A still further object of the invention is to provide a device of the character herewithin described which is simple in construction, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Figure 1:
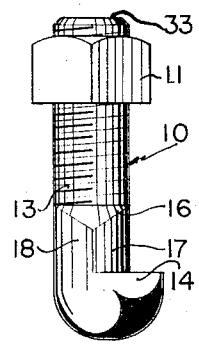
FIGURE 1 is a side elevation of the bolt and nut portion per se.
Figure 2:
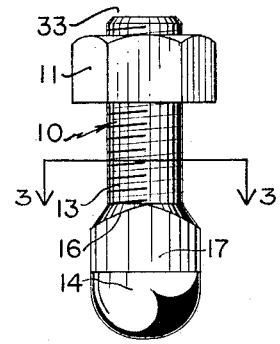
FIGURE 2 is a side elevation at right angles to that of FIGURE 1, but with the nut removed.
Figure 3:
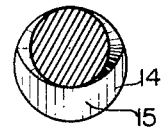
FIGURE 3 is a section along the lines 3—3 of FIGURE 1.

Proceeding therefore to describe the invention in detail, reference character 10 collectively designated as the bolt, 11 designates a conventional nut engageable upon the bolt, and 12 illustrates generally the combination washer plate and wedge component.

In detail, the bolt consists of a conventional screw-threaded shank 13 having a hooked head 14 formed upon one end thereof.

This hooked head includes a member engaging surface 15 extending at right angles from the longitudinal axis of the bolt and extending partially around the bolt shank 13.

Forming part of the head 14 and extending part way along the shank to a position generally indicated by the reference character 16, is an enlarged portion comprising a bolt aperture wall engaging surface or portion 17 which is arcuately curved, and a wedge engaging portion or surface 18 which is also arcuately curved so that a cross sectional view of this portion shows that the two surfaces join and form an elliptical cross section.

The radius of curvature of the portion or surface 17 is greater than the radius of the curvature of the bolt shank 13 and similar to the radius of curvature of the bolt aperture wall which it engages as will hereinafter be described.

The combination washer plate and wedge 12 comprises a planar plate 19 apertured as at 20 so that same freely engages the bolt shank 13.

A wedge 21 is formed with the plate and extends at right angles from the planar of the plate and upon one side 22 thereof. This wedge is formed with an outer arcuately curved surface 22 and an inner arcuately curved surface 23, the boundary of the inner end 24 of the inner curved surface being similar to the boundary 25 of the aperture 20 within the plate 19.

This inner surface 24 converges towards the outer surface 22 from the plate 19 to the distal end 26 of the wedge thus forming a tapered wedging surface which is arcuately curved.

The radius of curvature of the outer surface 22 of the wedge is similar to the radius of curvature of the bolt aperture within which it engages and the radius of curvature of the inner surface is generally similar to the radius of curvature of the portion 18 of the bolt 10.

Figure 7:
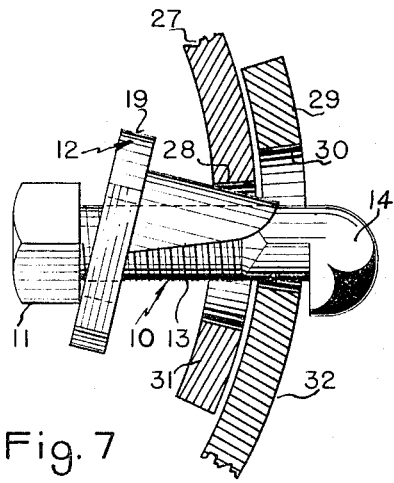
FIGURE 7 is a sectional view showing the assembly being inserted through apertures formed into adjacent members to be bolted together.
Figure 8:
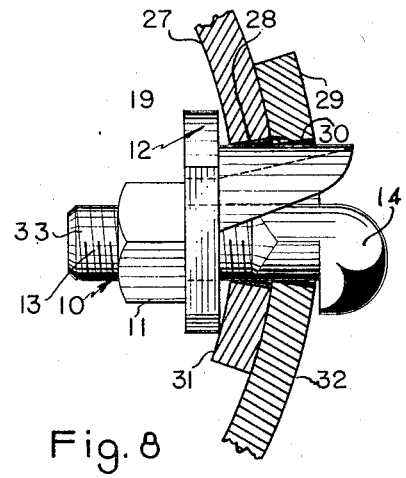
FIGURE 8 is a view similar to FIGURE 7, but showing the assembly tightened into clamping position.

FIGURES 7 and 8 show one environment within which the device finds particular usefulness.

Reference character 27 illustrates a portion of an inner liner plate having a bolt aperture 28 formed therein and reference character 29 illustrates a portion of an outer liner plate having a bolt aperture 30 formed therein.

Reference character 31 illustrates the inner surfaces of the the liner plates which may be installed within a tunnel and reference character 32, the outer surface of plate 29 which would be adjacent the wall of the tunnel being lined.

The nut 11 is moved to the end 33 of the bolt remote from the hooked head 14 thus permitting the hooked head to be engaged through the apertures 28 and 29 so that the surface 15 of the hooked head engages the surface 32 of the plate 29 where it forms the boundary of the aperture 30.

The washer plate, the aperture of which is slightly larger than the shank 13 of the bolt, is tilted slightly so that the wedge can be inserted through the apertures 28 and 30 whereupon the nut 11 is tightened upon the wedge plate.

As the wedge plate is moved towards the hooked head of the bolt, the surface 18 rides along the surface 24 of the wedge 21 which expands the two members so that the plates 27 and 29 are clamped together as shown in FIGURE 8. Due to the expansion caused by the wedging action between the wedge and the surface 18, and due to the radius of curvature of the surface 17 of the bolt and surface 22 of the wedge, a relatively large bearing area is presented by the bolt assembly to the walls of the apertures thus giving a relatively strong fastener for the two plates.

Figure 4:
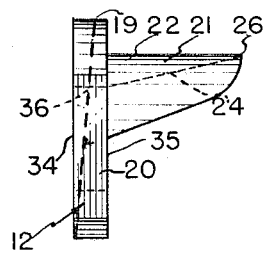
FIGURE 4 is a side elevation of the washer plate and wedge component.
Figure 5:
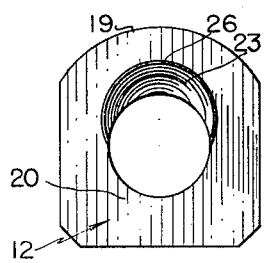
FIGURE 5 is an end view of FIGURE 4.
Figure 6:
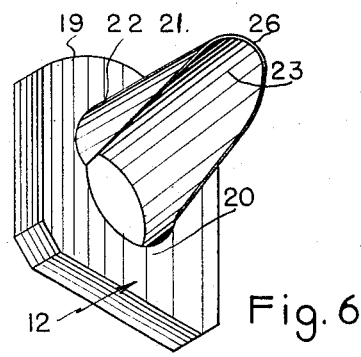
FIGURE 6 is an isometric view of FIGURE 4.

An alternative construction is shown in FIGURE 4 in phantom in which the thickness of the plate increases from the side or edge 34 to the opposite side or edge 35 thus giving an inclined undersurface shown in phantom at 36.

This facilitates the positioning of the wedge plate as the nut 11 is tightened and also assists in the camming action between the bolt and the wedge portion.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A hook bolt and nut assembly for engagement through a bolt aperture from one side of a member having said bolt hole aperture; comprising in combination a hook bolt having a hooked head at one end thereof insertable through said bolt aperture and engageable with the remote surface of said member forming the boundary of said bolt aperture and having an externally screw threaded shank portion at the other end thereof, a combination washer plate and wedge engageable over said bolt with said wedge entering said bolt aperture, and a nut engaging upon said threaded shank portion whereby said combination washer plate and wedge cooperates with said hooked head to secure said assembly to said member, said combination washer plate and wedge including an apertured plate, a wedge extending at right angles from the plane of said plate and upon one side thereof, said wedge having an arcuately curved outer surface and arcuately curved inner surface, said inner surface converging towards said outer surface from said plate towards the distal end of said wedge, the radius of curvature of said outer surface being similar to the radius of curvature of said bolt aperture wall, the aperture in said plate being of a diameter sufficiently greater than that of the bolt shank to permit said wedge to be pivoted until said inner surface contacts said bolt shank, thereby facilitating entry of said wedge into said aperture.

2. The device according to claim 1 in which said hooked head includes a member engaging surface extending at right angles to said bolt and extending partially around said bolt, said bolt including an arcuately curved bolt aperture wall engaging portion adjacent said member engaging surface, the radius of curvature of said portion being larger than the radius of curvature of said bolt and similar to the radius of curvature of said bolt aperture wall.

3. The device according to claim 2 in which said wall engaging portion is elliptical when viewed in cross section.

4. The device according to claim 1 in which the thickness of said aperture plate increases from the side thereof adjacent said wedge to the side thereof opposite said wedge.

5. The device according to claim 1 in which said wall engaging portion is elliptical when viewed in cross section.

References Cited by the Examiner

UNITED STATES PATENTS

| | | | |
|---|---|---|---|
| 612,489 | 10/1898 | Dean | 85—79 |
| 1,094,091 | 4/1914 | Ostheimer | 85—105 |
| 1,426,098 | 8/1922 | Pruitt | 85—1 |
| 1,998,116 | 4/1935 | Bone | 85—9 |
| 3,204,513 | 9/1965 | Sauvet | 85—9 |

FOREIGN PATENTS

| | | |
|---|---|---|
| 1,183,518 | 1/1959 | France. |
| 4,171 | 2/1912 | Great Britain. |

CARL W. TOMLIN, *Primary Examiner.*

R. S. BRITTS, *Assistant Examiner.*